United States Patent [19]

Banyas et al.

[11] 3,841,687
[45] Oct. 15, 1974

[54] CONTAINER HANDLING APPARATUS

[75] Inventors: John D. Banyas, Toledo; Frederick L. Wallington, Perrysburg, both of Ohio

[73] Assignee: Owens-Illinois, Inc., Toledo, Ohio

[22] Filed: June 17, 1971

[21] Appl. No.: 154,038

[62] Division of Ser. No. 24,173, Mar. 31, 1970

[52] U.S. Cl. .............. 294/64 R, 214/1 BS, 198/179
[51] Int. Cl. ............................................. B66c 1/02
[58] Field of Search..... 294/64, 65; 214/1 BS, 1 BT; 198/179

[56] References Cited
UNITED STATES PATENTS

| | | | |
|---|---|---|---|
| 2,607,620 | 8/1952 | Oliveri | 294/64 R |
| 2,665,013 | 1/1954 | Socke | 294/64 R |
| 2,812,061 | 11/1957 | Pfister | 214/1 BS |
| 3,125,228 | 3/1964 | Laidig | 214/1 BS |
| 3,181,563 | 5/1965 | Giffen | 294/64 R |
| 3,302,803 | 2/1967 | Mooney | 294/64 R |
| 3,696,596 | 10/1972 | Wegscheid | 294/64 |

*Primary Examiner*—Evon C. Blunk
*Assistant Examiner*—Joseph E. Valenza
*Attorney, Agent, or Firm*—J. R. Nelson

[57] ABSTRACT

Apparatus for handling and transferring bulb-shaped glass containers from one station in a container production line to another. A series of container handling vacuum chucks are linked together into an endless chain to pick glass containers in succession up from a first conveyor, to carry the containers through an inspection station, a coating tunnel and past a reject station and to then deposit the containers on a second conveyor. A control valve mounted on each chuck normally supplies the chuck with vacuum, however the control valve is actuated at the container discharge station, and may also be actuated at the reject station to supply air under pressure to the chuck to eject the container.

3 Claims, 9 Drawing Figures

INVENTORS
JOHN D. BANYAS.
FREDERICK L. WALLINGTON.
BY
ATT'YS.

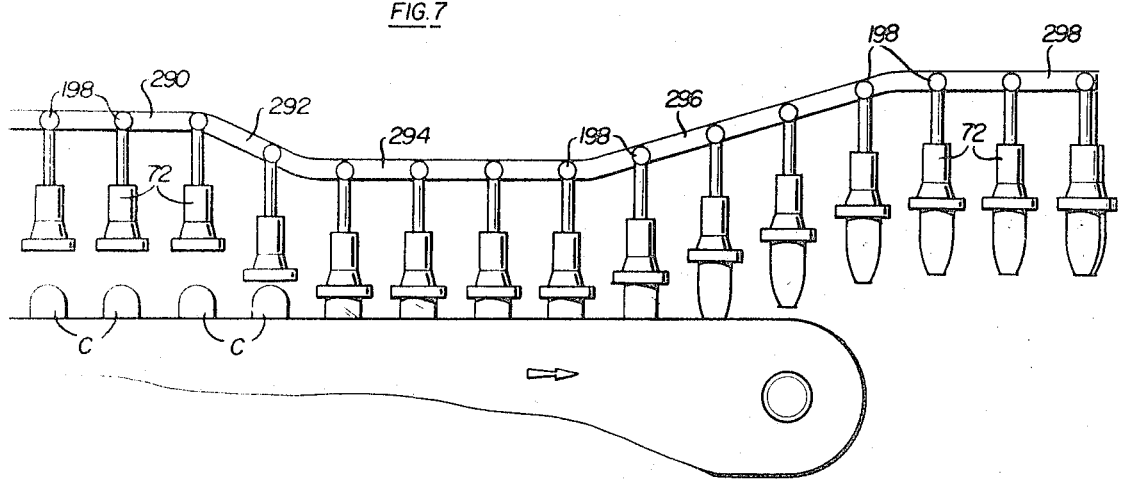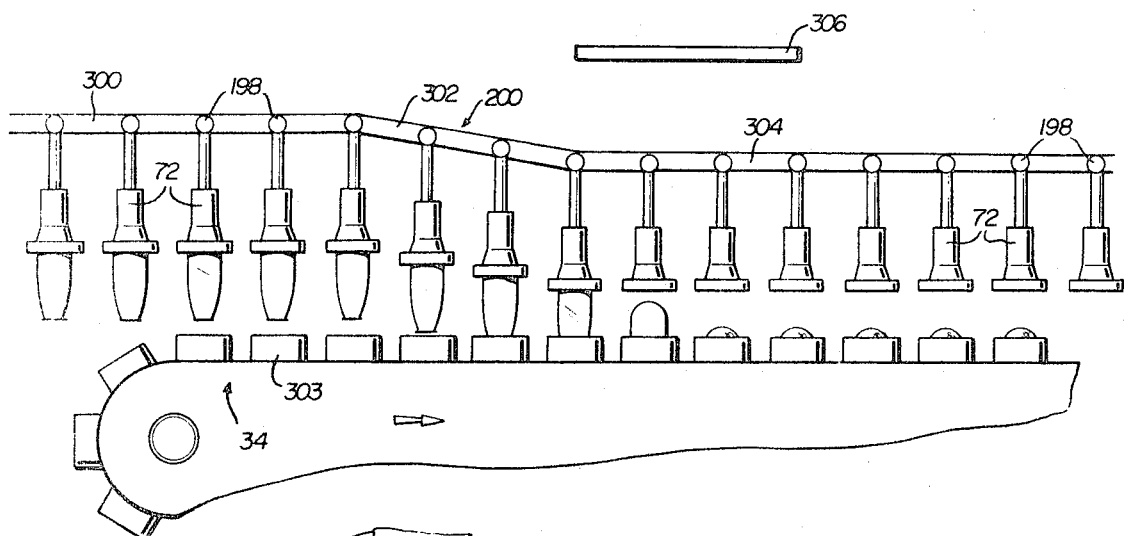

CONTAINER HANDLING APPARATUS

REFERENCE TO RELATED APPLICATION

This application is a division of our pending application Ser. No. 24,173, filed Mar. 31, 1970 now U.S. Pat. No. 3,637,074.

SUMMARY OF THE INVENTION

The container handling apparatus of the present invention is employed in a production line for producing composite containers of the type shown in U.S. Pat. No. 3,372,826. These containers consist of a bulb-shaped glass container having a hemispherical bottom and a cup-shaped plastic base element fitted onto and bonded to the bottom to provide stability to the assembled container. The apparatus of the present invention is employed to receive the bulb-shaped glass containers in an inverted position from a heat-treat conveyor, to carry the container through a spray tunnel where the container is provided with a coating to enhance the scratch resistance and lubricity of the glass container and to subsequently deposit the container in an assembly machine where the plastic base is assembled on the container. In addition to coating the container, an inspection device inspects the side wall and finish of the container before the spray tunnel and is linked to a rejection mechanism which, in response to signals from the inspection station, is operable to reject malformed containers before they are deposited on the assembly machine.

To grip and carry the containers, the apparatus includes a plurality of vacuum chucks linked together into an endless chain for movement along an endless path during which the chucks are successively moved into operative alignment with containers on the infeed conveyor, are manipulated to pick the containers up from the infeed conveyor, carry them through the inspecting, coating and reject stations and to then move into operative alignment with the assembly machine and deposit the containers onto the assembly machine. In view of the relatively high line speed (as many as 600 containers per minute) the vacuum chuck is provided with a control valve which is actuable to supply air under pressure to the chuck to provide a rapid ejection of the container from the chuck either at the reject station or at the discharge station.

Other objects and features of the invention will become apparent by reference to the following specification and to the drawings.

IN THE DRAWINGS

FIG. 7 is a schematic view illustrating the manner in which containers are picked up or loaded onto the apparatus;

FIG. 8 is a schematic view showing the manner in which the containers are normally transferred from the apparatus of the present invention to the assembly machine; and FIG. 9 is a simplified cross-sectional view of the spray tunnel.

GENERAL DESCRIPTION OF SYSTEM

Figure 1:
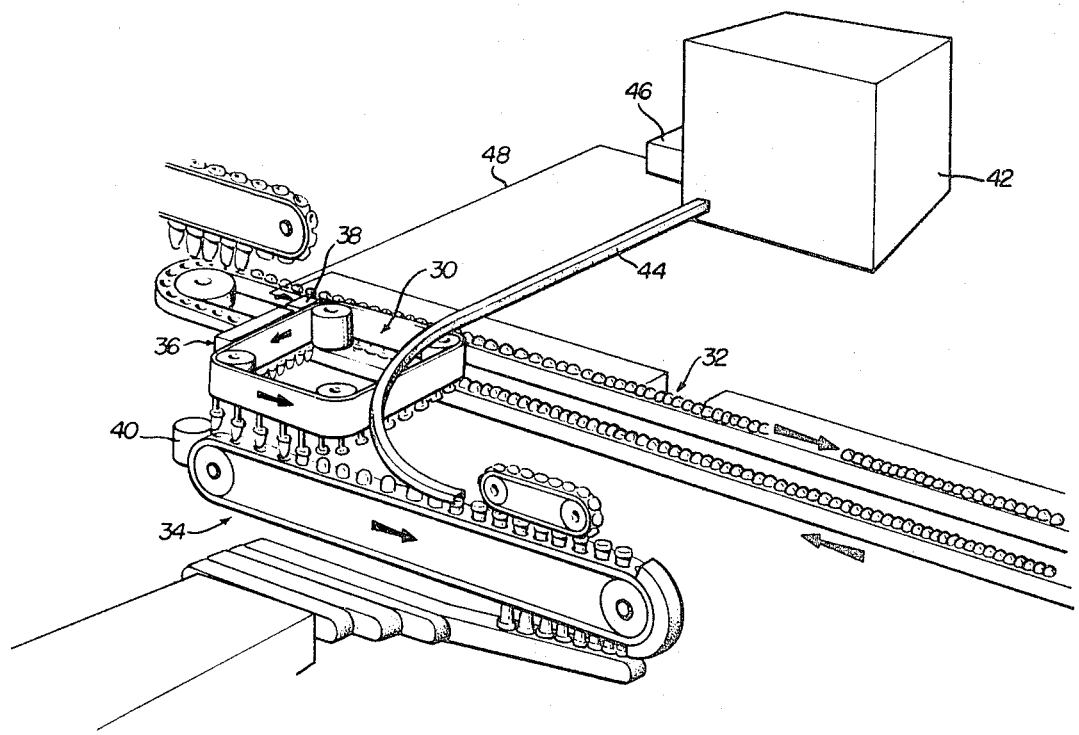
FIG. 1 is an overall perspective view of an installation embodying the present invention.

Referring first to FIG. 1, there is shown a portion of a production line for making and assembling composite containers of the type shown in U.S. Pat. No. 3,372,826. These composite containers consist of a bulb-shaped glass container having a hemispherical bottom and a cup-shaped plastic base element which is fitted onto and bonded to the glass container bottom to provide a stable support for the container.

The function of the machine 30, to which the present application is directed, is to transfer the glass containers from a heat-treat conveyor designated generally 32 in FIG. 1 to an assembly machine 34, upon which the plastic base elements are assembled onto the glass container. Assembly machine 34 is the subject of a U.S. Pat. No. 3,630,797.

During the transfer of the containers from conveyor 32 to assembly machine 34, the containers are sprayed with a coating to improve the scratch resistance and lubricity of the container. This coating is applied as the container is conveyed by machine 30 through a spray tunnel designated generally 36. Before its passage through tunnel 36 the container is subjected to a sidewall and finish inspection and substandard containers are automatically rejected at a reject station designated generally 38 and drop into a cullet chute 40.

The reject station may be operated to reject all containers passing through machine 30. One of many examples of situations where it might be wanted to reject all containers would be in the event that the supply of plastic bases which are to be assembled on the containers at assembly machine 34 is depleted. The plastic bases are supplied from a schematically illustrated base supply source 42 via a chute 44 to assembly machine 34. A suitable detector 46 on base supply source 42 is operatively connected by a control coupling schematically illustrated at 48 to reject station 38 and operates the reject station, in a manner described in detail in our aforementioned U.S. Pat. No. 3,637,074, to continually reject containers in the event of an inadequate supply of bases.

HEAD ASSEMBLY

Figure 4:
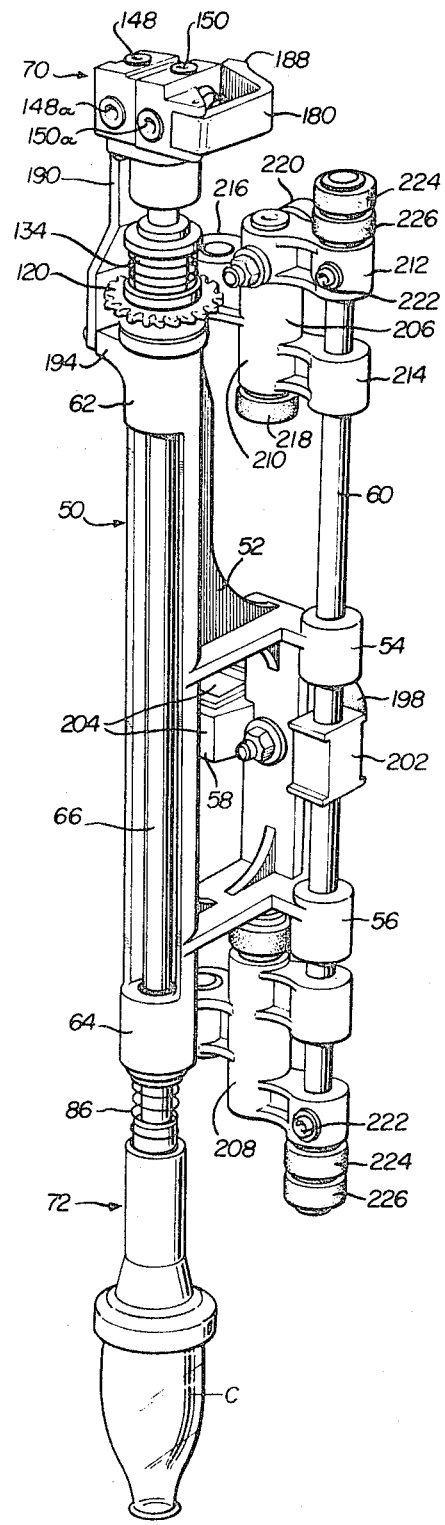
FIG. 4 is a perspective view of a container handling head employed in the apparatus.
Figure 5:
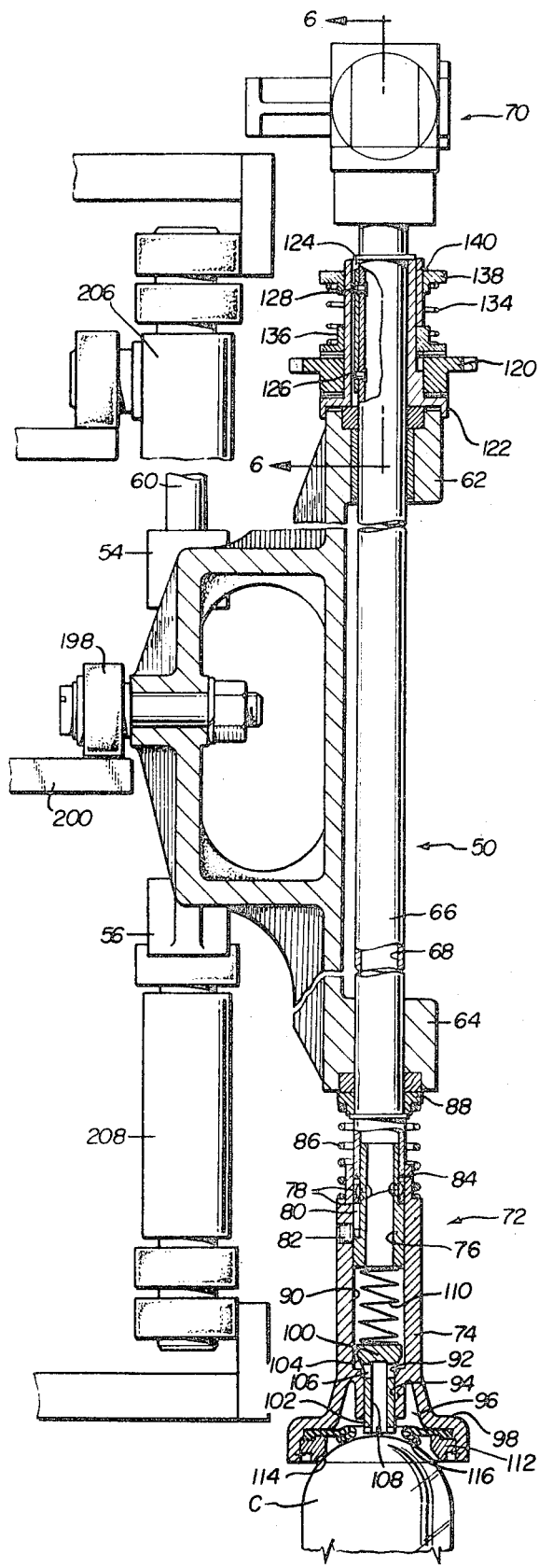
FIG. 5 is a detail cross-sectional view taken on a central vertical plane through the container handling head.
Figure 6:
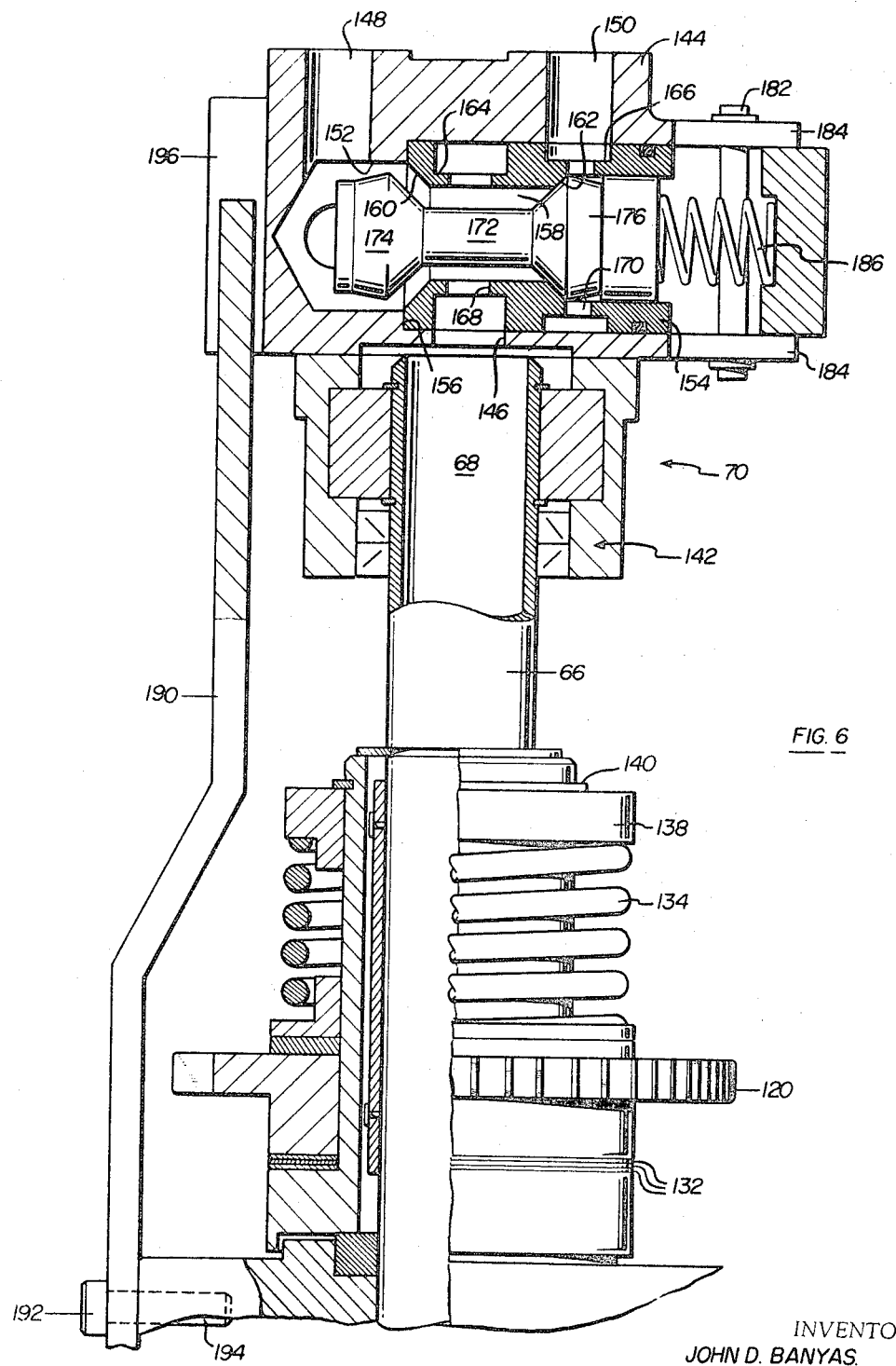
FIG. 6 is a detail cross-sectional view, taken approximately on line 6—6 of FIG. 5, showing details of the chuck control valve.

To transport the containers between conveyor 32 and assembly machine 34, machine 30 employs a plurality of individual head assemblies designated generally 50 which are linked together into an endless chain for movement along a generally rectangular endless path. Details of an individual head assembly 50 are shown in FIGS. 4–6.

Each head assembly 50 includes a support bracket 52 having a pair of vertically spaced front coupling bushings 54, 56 and a rear coupling bushing 58. In linking the head assemblies into an endless chain, vertical rods 60 are passed through the upper and lower coupling bushing 58 of the next adjacent head assembly.

Each bracket 52 also is constructed with vertically spaced upper 62 and lower 64 chuck support bushings which rotatively receive a hollow tubular chuck shaft 66. The hollow interior of shaft 66 defines a conduit 68 which provides fluid communication between a control valve designated generally 70 mounted on the upper end of shaft 66 and a chuck designated generally 72 mounted on the lower ends of shaft 66.

Chuck 72 includes an annular housing 74 which is mounted for axial sliding movement on the lower end of shaft 66 by a structure which includes an adaptor 76 fixedly secured, as by rivets 78, to the lower end of shaft 66 and having an axial extending groove 80 which slidably receives a pin 82 mounted in housing 74 to guide and define end limits of axial movement of housing 74 on lower end of shaft 66. A sliding seal at 84 is provided between shaft 66 and housing 74. Housing 74 is normally maintained at its lower end limit of travel relative to shaft 66 both by gravity and by a biasing spring 86 seated between the upper end of housing 74 and a retainer 88 seated at the lower end of lower coupling bushing 64.

Housing 74 is formed with a central passage 90 having an inwardly tapering valve seat 92 near its lower end. A reduced diameter passage 94 extends axially downwardly from valve seat 92 and opens at its lower end into a recess 96 formed in the interior of an enlarged diameter end portion 98 of housing 74. A valve member having a head 100 also includes a stem 102 which is slidably received within reduced diameter passage 94. Head 100 is formed with a conical surface 104 adapted to seat against valve seat 92. Transverse passages 106 communicate with an axial passage 108 through the stem to place passage 90 in communication with recess 96 when the valve is unseated as shown in FIG. 5. Head 100 is normally biased against seat 92 by a compression spring 110 seated between the valve head and the lower end of adaptor 76.

At the mouth of recess 96, an annular container seat 112 is mounted within housing 74. The container engaging surface of seat 112 surrounds an opening 114 which is of a diameter smaller than the diameter of the bottom of a container C. Inwardly of recess 96 from container seat 112 is mounted an annular seal 116 which, as indicated in FIG. 5, provides a peripheral seal closing chamber 96 from the atmosphere when a container bottom is engaged with seat 112. With the container thus seated, the container bottom engages the lower end of the valve stem 102 to elevate the valve head off valve seat 92, thereby placing passage 90 and the interior of shaft 66 in communication with recess 96. When no container is engaged with seat 112, surface 104 of valve head 100 sealingly engages valve seat 92 to block communication between passage 90 and recess 96.

Shaft 66 and chuck 72 may be driven in rotation in bushings 62 and 64 by means of a sprocket 120 mounted on shaft 66 above upper coupling bushing 62. A flanged sleeve 122 is mounted upon shaft 66 and formed with an axial extending key slot 124 which receives a key in the form of a strip of metal 126 riveted to shaft 66 as by rivets 128. Sprocket 120 is made of a molded polyeurethane material which acts as a friction surface and is frictionally biased against flanged sleeve 122 by a spring 134 engaged between two flanged hubs 136 and 138. Hub 138 is held against axial movement on sleeve 122 by a keeper ring 140.

Valve 70 is mounted upon the top of shaft 66 for rotation relative to the shaft by a coupling sleeve assembly designated generally 142 which forms a rotary seal with the top of shaft 66. Housing 144 of valve 70 is constructed with an outlet port 146 in direct communication with the internal conduit 68 of shaft 66. At the top of housing 144 a pressure supply port 148 and a vacuum supply port 150 are bored into the housing to communicate with a central passage 152 bored in housing 144. A cartridge sleeve 154 is received within bore 152 and is axially seated at its inner end against a shoulder 156 in passage 152. Cartridge 154 is formed with a central axially extending passage 158 which goes all the way through sleeve 154 and is internally formed with two oppositely facing valve seats 160 and 162. Two annular grooves 164 and 166 extend around the periphery of sleeve 154 and communicate with the central passage 158 via ports 168 and 170 respectively. Auxiliary pressure and vacuum ports 148a and 150a are bored in housing 144 and are in constant communication with the corresponding ports 148 and 150 via the inner end of passage 158 (ports 148 and 148a) and recess 166 (ports 150 and 150a).

A valve member 172 is provided with a pair of oppositely facing valve heads 174 and 176 which are respectively engageable with valve seats 160 and 162.

In FIG. 6, valve 70 is shown in its abnormal or actuated position in which valve head 174 is spaced clear of seat 160 to place port 148 in communication with ports 168 and 146.

Valve 70 is normally maintained in the opposite condition to that shown in FIG. 6 with valve head 174 seated against valve seat 160 and valve head 176 spaced to the right from valve seat 162. In this position, vacuum supplied to port 150 passes through the valve to ports 168 and 146. Air under pressure supplied at pressure supply port 148 acts against the left-hand side of valve head 174 to maintain the valve in the normal position, this action being augmented by the reduced pressure at the right-hand side of valve head 174.

Valve 70 is shifted to the abnormal or actuated position shown in FIG. 6 by a valve actuating arm 180 pivotally mounted upon a pin 182 passing through a pair of lugs 184 integrally formed on valve housing 144 (see FIG. 10). A compression spring 186 is engaged between the inner side of actuating arm 180 and the right-hand end of valve member 172. As best seen in FIG. 4, actuating arm 180 is of a generally U-shaped configuration when viewed from the top, one leg of the U being mounted on pin 182 and the opposite leg of the U being projected clear of the valve body at its opposite side and terminating in an enlarged actuator engaging bump 188.

Under normal conditions, air under pressure acting against the left-hand side of valve head 174 is sufficient to hold head 174 against its seat 160 and, through the action of spring 186, position arm 180 at its extreme limit of clockwise movement about pivot pin 182 as viewed in FIG. 4. During movement of the head assembly along its path, actuator arm 180 is at the front or leading side of the assembly with respect to its direction of movement with the bump 188 on the arm projecting out to one side of the path. Upon engagement of bump 188 with either a stationary cam on the machine frame or by actuating element of a reject system to be described below, the engagement pivots arm 180 in a counterclockwise direction about pivot pin 182 through spring 186 to shift valve member 172 to the position shown in FIG. 6. Spring 186 is quite stiff and does not normally compress during valve shifting. However, the spring can give when the valve is seated to permit overtravel.

Valve 70 is held against rotation with shaft 66 by an upwardly projecting finger 190 bolted at its lower end as by bolts 192 to a projection 194 on upper coupling bushing 62. The upper end of finger 190 is slidably received within a complementary slot 196 formed on housing 144. The sidewalls of slot 196 engage the upper end of finger 190 to hold valve body 144 against rotation with shaft 66.

Vertical rods 60 which link head assemblies 50 into an endless chain are supported and guided for movement relative to the machine frame along a fixed path by structure to be described below. In picking up containers from conveyor 32 and depositing the containers on assembly machine 34, it is necessary for the head assemblies to move up and down in a vertical direction relative to the fixed path of rods 60. Bushings 54, 56 and 58 enable head assembly 50 to slide up and down on rods 60. Vertical positioning of head assemblies 50 along rods 60 is accomplished by a support roller 198 rotatably mounted on bracket 52 for rotation about a horizontal axis, roller 198 being supported upon a track 200 fixedly mounted on the machine frame and provided with appropriate inclined and flat sections to be discussed below.

As explained above, when the head assemblies 50 are assembled into an endless chain, a series of vertical rods 60 are employed, each rod passing through the front coupling bushings 54 and 56 of one head assembly and also through the rear coupling bushing 58 of the next head assembly 50. Coupling bushing 58 is one of the floating type in which a bushing element 202 is slidably received between a pair of arms 204 formed on support bracket 52 so that bushing 202 can shift horizontally forward and backwards to accommodate a slight relative displacement between the adjacent head assemblies.

Vertical rods 60 of the endless chain are coupled to each other by upper and lower link assemblies 206 and 208 respectively. With two minor exceptions to be discussed below, upper and lower links 206 and 208 are identical, and thus only link 206 will be described in detail, it being understood that the description is equally applicable to lower link 208.

Link 206 is formed with a vertically extending central body portion 210 having integrally formed upper 212 and lower 214 front coupling bushings projected forwardly from body 210. Bushings 212 and 214 are vertically spaced from each other, and a rear coupling bushing 216 is formed centrally on the rear of body 210. A roller 218 is rotatably mounted in link body 210 for rotation about a vertical axis, while a support roller 220 is mounted in body 210 for rotation about a horizontal axis near the upper end of body 210.

Link 208 is identical in structure to link 206, except that link 208 does not have a support roller 220 and link 208 is mounted upon rods 60 in an upsidedown relationship relative to upper link 206.

Links 206 and 208 couple rods 60 to each other into an endless chain, each rod 60 passing through the front coupling bushings of one link and the rear coupling bushing of an adjacent link, the rear coupling bushing of one link projecting between the front coupling bushings of the next link.

The front coupling bushings of each link 206 and 208 are fixedly secured to the vertical rod 60 as by bolts 222 which pass radially through one of the front bushings into tapped bores in rod 60. The rear coupling bushings are freely rotatable on rods 60. Pairs of guide rollers 224 and 226 are rotatably mounted at the upper and lower ends respectively of each rod 60.

Figure 2:
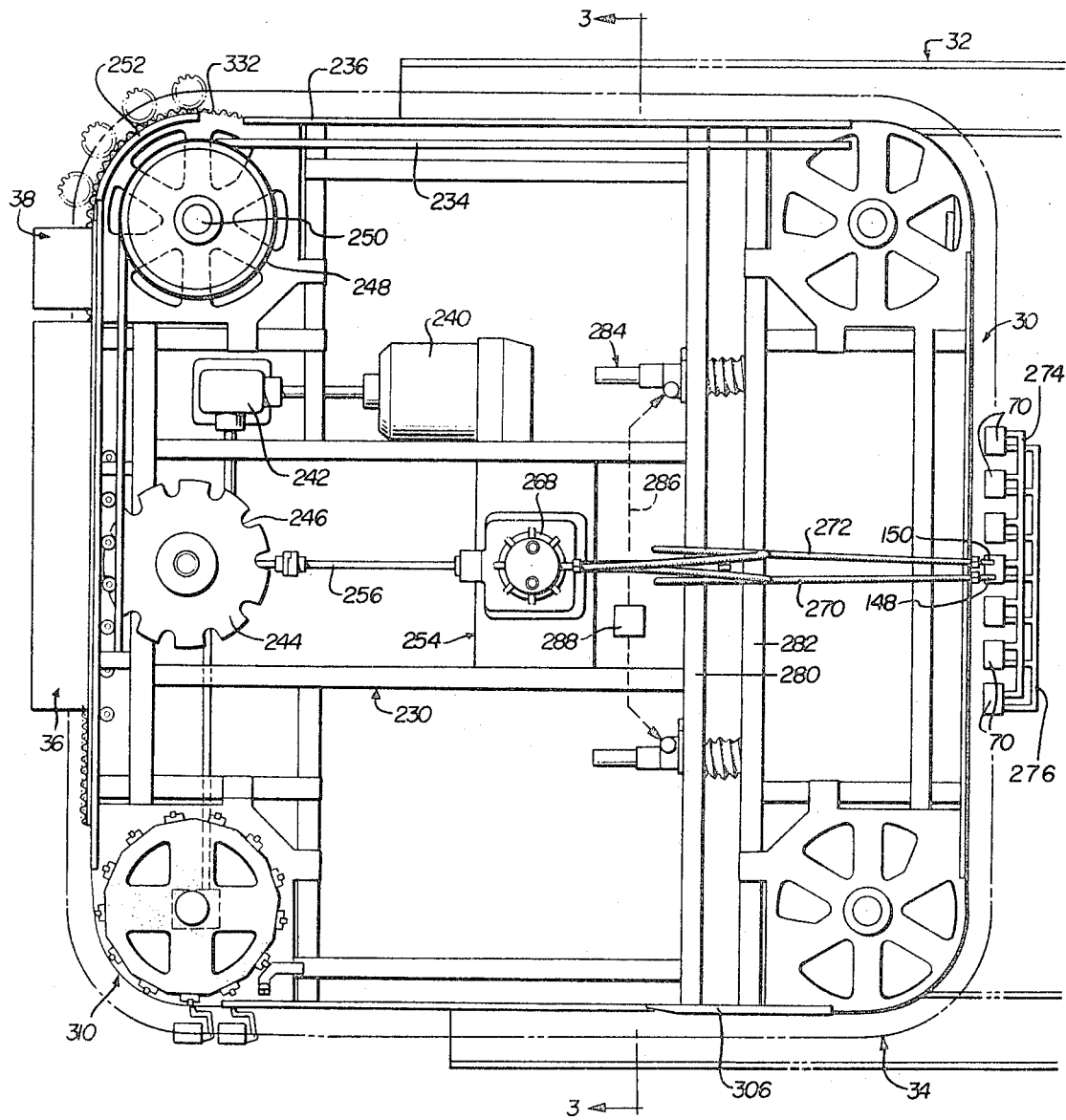
FIG. 2 is a top plan view of the container handling apparatus of the present invention with certain parts broken away or omitted for the sake of clarity.
Figure 3:
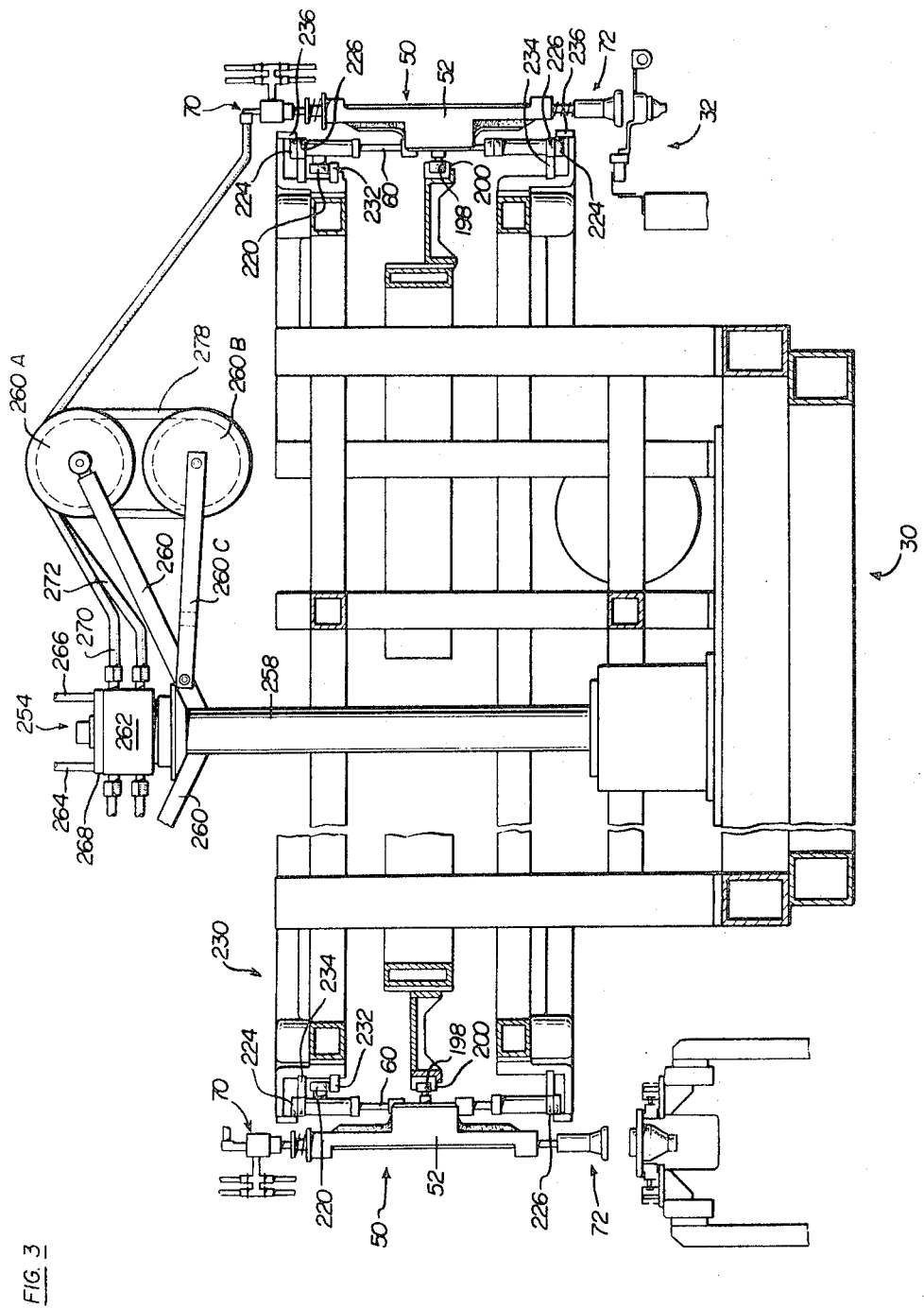
FIG. 3 is a cross-sectional view of the apparatus taken approximately on line 3—3 of FIG. 2, again with various parts broken away or omitted.

Referring now to FIG. 3, the support rollers 220 and guide rollers 224 and 226 rotatably engage various tracks fixedly mounted upon the frame 230 of machine 30. Support rollers 220 of upper links 206 support rods 60 from a track 232 fixedly mounted upon the machine frame and extending along the entire periphery of the path of movement of the endless chain formed by the linked rods 60. Track 232 is horizontal throughout its entire extent and forms a horizontal reference plane from which vertical positioning of the individual head assemblies 50 can be measured. The paired sets of guide rollers 224 and 226 at the respective upper and lower ends of rods 60 engage inner and outer guide tracks 234 and 236 respectively. The configuration and structure of the inner and outer guide tracks 234 and 236 which engage and guide upper guide rollers 224 is identical to the corresponding set of lower tracks 234 and 236. Inner and outer tracks 234 and 236 define the configuration of the endless path of movement of the linked chain of rods 60, this path when viewed from above (see FIG. 2) being of generally rectangular shape having rounded corners. Tracks 232, 234 and 236 thus define a fixed and unvarying path of movement of rods 60 while rods 60 in turn support head assemblies 50 for vertical movement on the rods, under the control of roller 198 and its cam track 200.

Further details of structure and functions referred to in the "General Description" above are found in parent U.S. Pat. No. 3,637,074.

In order to achieve uniform exposure of all sides of the container to the coating vapor during the passage of the container through spray tunnel 36, chuck 72 is driven in rotation to rotate the container about its vertical axis throughout its passage through tunnel 36. Rotation of the chuck is accomplished by means of a spincycle chain 332 (FIG. 2) which is mounted at a fixed position upon frame 230 at a location to engage the teeth of sprockets 120 of head assmblies 50 as the heads pass above spray tunnel 36. Chain 332 is stationary and the motion of the heads along the endless path causes sprockets 120 to be rotated, thus rotating chucks 72 and the suspended container.

Before the containers are driven through spray tunnel 36, they are passed through inspection station 38, at which the side wall and finish of the containers are inspected by a conventional inspection device. Details of the inspection device do not form, per se, any part of the present invention and any of several commercially available devices capable of generating an electric pulse or signal upon the detection of a malformed container might be employed. The electric pulse or signal generated by the inspection device when it detects a malformed container is fed into an electronic shift register incorporated in the inspection station which triggers reject station 310 when the malformed container reaches the reject point.

Details of the reject station 310 are set forth in U.S. Pat. No. 3,637,074.

SUMMARY OF OPERATION

To summarize the operation of the various devices described individually above, the endless chain of head assemblies 50, linked together by vertical rods 60, is driven in continuous movement around a generally rectangular endless path by drive motor 240. Movement of heads 50 along their endless path is synchronized with the movement of container supporting elements on both conveyor 32 and assembly machine 34 so that during those portions of their path in which the heads overlie conveyor 32 in assembly machine 34, each individual head is located and maintained in vertical alignment with a container or container support on conveyor 32 or assembly machine 34. The elevation of track 200 on the machine frame which supports a support roller 198 rotatably mounted on each head. Those portions of track 200 which overlap conveyor 32 and assembly machine 34 are formed with a depressed or dip section (FIGS. 7 and 8) which enables the heads to slide downwardly into operative relationship with the conveyor 32 or assembly machine 34 to pick up containers from conveyor 32 or to deposit containers onto assembly machine 34.

Each head assembly 50 carries at its lower end a pneumatic chuck (FIG. 5) which is supported upon hollow shaft or spindle mounted for rotation about a vertical axis in the head assembly. At the upper end of each hollow shaft, a control valve 70 is mounted and connected, via conduits 270 and 272 to both a vacuum source and a supply of air under pressure, the two sources being connected to conduits 270 and 272 via a rotating carousel mounted centrally of the machine.

The valves 70 are normally self-maintained in a position such that the vacuum source is connected to the hollow spindle of the chuck. A valve member 100 is mounted at the lower end of the internal passage of the hollow shaft and is normally closed to block communication between the interior of the shaft and the interior of the chuck. When the chuck is lowered onto the bottom of an inverted container on conveyor 32, the container bottom engages a stem 102 on valve 100 and lifts this valve clear of its seat, thereby permitting the chuck to be evacuated to hold the container onto the chuck by vaccum. After the container has been gripped by the application of vacuum to the chuck, the head 50 moves onto an upwardly inclined section of track 200 and the head and suspended container are lifted clear of conveyor 32.

The head 50 then passes around a corner of its endless path and, as it does so, the sprocket 120 mounted upon the head engages a stationary chain 332 extending along the sprocket path so that the sprocket and the coupled hollow shaft and chuck are driven in rotation to rotate the suspended container about its axis as it passes along the chain.

The rotating container is carried through inspection station 38 where it is inspected for flaws in its sidewall or finish. If the container is flawed, the inspection station generates a signal which is employed to operate the reject mechanism to shift the valve connections to supply air under pressure to the chuck carrying the flawed container to eject the container as its head assembly moves around the corner of the path approaching assembly machine 34.

After the container passes inspection station 38, it is carried through spray tunnel 36 where the container is exposed to a vapor spray of a coating material which improves the scratch resistance properties and lubricity of the container. During its transit through tunnel 36, the container is driven in rotation by the interengagement between the sprocket 120 on the head carrying the container and stationary chain 332 to achieve a uniform exposure of the container to the vapor spray within tunnel 36.

It has been found preferable to locate the inspection station 38 upstream from spray tunnel 36 to minimize exposure of the detecting elements of the inspection station to vapor from tunnel 36, the passage of the containers through spray tunnel 36 creating an air current which tends to create a slight flow of vapor from the downstream end of tunnel 36.

If the container inspected at inspection station 38 is found satisfactory, reject mechanism 310 does not eject the container, the latch member 342 of the appropriate reject latch assembly being maintained in its normal retracted position in which it passes beneath the valve actuating arm 180. After passing the reject station 310, the container is carried by the chuck into overlying relationship with assembly machine 34 and a container receiving sprocket 303 is, by synchronism of machine 34 with the movement of head assemblies 50, positioned and maintained in vertical alignment beneath the suspended container. The support roller of the head assembly 50 moves onto a downwardly inclined section of its support track 200, thus lowering the chuck and its suspended container until the container is partially inserted into the aligned pocket 303 on assembly machine 34. At this point, the valve actuating arm 180 is carried into engagement with a stationary cam 306 which depresses the actuating arm to shift the valve 70 to supply air under pressure to the chuck to eject the container from the chuck into the pocket 303.

Having described one embodiment of our invention,

We claim:

1. In a container handling apparatus for handling containers having hemispherical bottoms; container chuck means comprising a hollow annular housing having an open recess at one end and having an inlet passage extending from said recess coaxially through the opposite end of said housing, means in said recess at said one end of said housing defining an annular seat adapted to engage the hemispherical bottom of a container to locate the container in coaxial relationship with said housing with the container bottom projecting a predetermined distance into said recess, a flexible annular seal means mounted in said housing in coaxial relationship with said seat and located to sealingly engage the bottom of a container before the container engages said seat and to maintain the sealing engagement with the container bottom when the container bottom is engaged with said annular seat, valve means in said inlet passage having a valve seat within said inlet passage facing away from said recess of said housing, a valve head slidably mounted in said inlet passage for movement into and out of engagement with said valve seat and operable, when engaged on said valve seat to block communication between said inlet passage and recess, means in said inlet passage normally biasing said valve head against said valve seat, a stem on said valve head slidably received in said inlet passage and projecting from said inlet passage into said recess, said stem having a central passage extending partially therethrough opening into said recess and a cross passage opening from said central passage at a location between said head and said recess, said cross passage being blocked when said head is seated and being unblocked when said head is disengaged with said seat the recess end of said stem being engageable by the bottom of a container engaged by said annular seal to disengage said valve head from said valve seat to thereby place said inlet passage upstream of said seat in communication with said recess via said cross and central passages, and supply means in fluid communication with said inlet passage upstream of said seat for selectively connecting said inlet passage to a source of vacuum or to a source of air under pressure.

2. The invention defined in claim 1 wherein said supply means comprises a source of vacuum and a source of air under pressure, a hollow shaft coaxially and fixedly mounted upon said opposite end of said housing with the interior of said hollow shaft in direct communication with said inlet passage, and control valve means mounted upon the end of said shaft remote from said housing and connected to said source of vacuum and said source of air under pressure, said control valve means bieng operable in one position to connect the interior of said shaft to said source of vacuum, and being operable in a second position to connect the interior of said shaft to said source of air under pressure.

3. A container handling chuck for supporting containers having hemispherical bottoms comprising an annular housing having a recess opening at one end of said housing, an annular container seat mounted on said housing at the mouth of said recess adapted to engage the bottom of a container to locate the container on said housing with the container bottom projecting a predetermined distance into said recess, a resilient annular seal mounted in said housing in coaxial relationship with said seat, said seal having an outwardly opening frustoconical container engaging lip located relative to said seat to engage the container bottom when said container bottom is spaced from said seat and to flex into annular sealing engagement with the container bototm when said bottom is engaged with said seat, control means on said chuck for selectively supplying air under pressure or vacuum to said recess at a location inwardly of said recess from said seal, valve means normally blocking communication between said control means and said recess, and a stem on said valve means engageable by a container moving toward said seat to open said valve means, said stem having a cross passage therethrough at a location below said seat and an axial passage extending from said cross passage and opening into said recess to establish communication between said control means and said recess in response to the seating of a container bottom on said seat, said stem normally projecting into said recess by a distance such as to be first engaged by said container only after said container has engaged said annular seal.

* * * * *